(12) United States Patent
Kawai et al.

(10) Patent No.: US 7,965,424 B2
(45) Date of Patent: Jun. 21, 2011

(54) SCANNER APPARATUS WITH AUTOMATIC DOCUMENT FEEDER SWIVELLED TO ACCOMMODATE DIFFERENT USERS AND INSTALLATIONS

(75) Inventors: Masayoshi Kawai, Ishikawa (JP); Norio Kanemitsu, Uchinada-machi (JP); Tamio Amagai, Sano (JP)

(73) Assignee: PFU Limited, Kahoku-shi (JP)

( * ) Notice: Subject to any disclaimer, the term of this patent is extended or adjusted under 35 U.S.C. 154(b) by 1349 days.

(21) Appl. No.: 10/575,227

(22) PCT Filed: Dec. 2, 2004

(86) PCT No.: PCT/JP2004/017919
§ 371 (c)(1),
(2), (4) Date: Apr. 7, 2006

(87) PCT Pub. No.: WO2005/062599
PCT Pub. Date: Jul. 7, 2005

(65) Prior Publication Data
US 2007/0127104 A1      Jun. 7, 2007

(30) Foreign Application Priority Data

Dec. 18, 2003   (JP) ................................. 2003-420888

(51) Int. Cl.
H04N 1/04       (2006.01)
H04N 1/00       (2006.01)
(52) U.S. Cl. ......... 358/474; 358/498; 358/408; 358/401
(58) Field of Classification Search .................. 358/498, 358/408, 474, 481, 494, 487; 382/317; 271/294, 271/228, 279, 287; 399/405, 362, 367, 197, 399/397, 403, 407, 408
See application file for complete search history.

(56) References Cited

U.S. PATENT DOCUMENTS 4,962,430 A    10/1990   Hiroki et al.
(Continued)

FOREIGN PATENT DOCUMENTS
DE        39 35 713 A1    5/1990
(Continued)

OTHER PUBLICATIONS

Fujitsu PFU Limited fi-5750C Image Scanner Getting Started Dec. 2003 P3PC-E737-01EN by PFU Limited.*

(Continued)

Primary Examiner — Benny Q Tieu
Assistant Examiner — Ngon Nguyen
(74) Attorney, Agent, or Firm — RatnerPrestia

(57) ABSTRACT

The present invention provides a scanner apparatus provided with both a flatbed-type mechanism and an ADF-type mechanism. The ADF mechanism can be set at an arbitrary position with an arbitrary orientation for use, whereby convenience for the user is improved while ensuring freedom with regard to the setting place of the apparatus. Further, the scanner apparatus is made such that reading with the ADF unit and reading with the flatbed unit can be performed simultaneously. A movable coupling mechanism is provided at a joint portion between the ADF mechanism and the flatbed mechanism. The movable coupling mechanism does not fix the position and orientation of the ADF mechanism and enables the ADF mechanism to be freely moved and rotated. With this movable coupling mechanism, the ADF mechanism can be disposed at either of the left and right ends of the paper-pressing board of the flatbed unit or at an arbitrarily position in consideration of convenience for a user and the setting place of the apparatus. Further, the orientation of the shooter of the ADF mechanism can be freely changed.

6 Claims, 10 Drawing Sheets

U.S. PATENT DOCUMENTS

| | | | | |
|---|---|---|---|---|
| 6,069,715 | A | * | 5/2000 | Wang .......................... 358/498 |
| 6,160,642 | A | | 12/2000 | Mui et al. |
| 6,522,862 | B2 | * | 2/2003 | Koshimizu et al. .......... 399/405 |
| 6,661,543 | B1 | | 12/2003 | Morita |
| D514,575 | S | * | 2/2006 | Sugitani et al. .............. D14/422 |

FOREIGN PATENT DOCUMENTS

| | | |
|---|---|---|
| EP | 1 361 746 A | 11/2003 |
| GB | 2 238 758 A | 6/1991 |
| JP | 08-336003 | 12/1996 |
| JP | 09-065029 | 3/1997 |
| JP | 2000-232545 | 8/2000 |
| JP | 2000-295391 | 10/2000 |
| JP | 2002-131852 | 5/2002 |

OTHER PUBLICATIONS

International Preliminary Report on Patentability, mailed on Aug. 3, 2006, in corresponding PCT Patent Application.

Supplementary European Search Report dated Oct. 20, 2006 for corresponding European patent application No. 04820658.5-2202.

Japanese Office Action, Reference No. 03P00040, Mailing No. 502580, dated Aug. 19, 2008 w/English translation.

* cited by examiner

FOR RIGHT-HANDED USERS

FOR LEFT-HANDED USERS

PRIOR ART (FLATBED-TYPE)

OPTICAL READING UNIT

PRIOR ART (ADF-TYPE)

OPTICAL READING UNIT

SCANNER APPARATUS WITH AUTOMATIC DOCUMENT FEEDER SWIVELLED TO ACCOMMODATE DIFFERENT USERS AND INSTALLATIONS

This application claims the benefit of PCT International Application Number PCT/JP2004/017919 filed Dec. 2, 2004 and Japanese Application No. 2003-420888, filed Dec. 18, 2003 in Japan, the disclosures of which are incorporated herein by reference.

TECHNICAL FIELD

The present invention relates to a scanner apparatus provided with both a flatbed-type mechanism and an auto-document feeder (ADF)-type mechanism. Specifically, the present invention realizes a scanner apparatus in which the ADF and flatbed mechanisms are separated from each other, which includes a mechanism for enabling the ADF mechanism to be set at an arbitrary position with an arbitrary orientation for use thereof, thereby increasing the freedom of setting of the apparatus and making it easier to use for both left and right-handed users, and which can simultaneously perform reading with the flatbed unit and reading with the ADF unit.

BACKGROUND ART

There are mainly two types of scanner apparatuses; i.e., a flatbed-type shown in FIG. 9(A), which is suitable for reading books, magazines, or the like; and an ADF-type shown in FIG. 9(B), which can continuously read papers having a predetermined size and a sheet-like shape. The ADF-type is convenient in that it can automatically and continuously feed sheet-shaped documents having a predetermined size so as to perform reading processing. Nonetheless, it cannot read thick documents such as books and magazines. On the other hand, the flatbed-type can read thick documents such as books and magazines, however, the user must set the documents on the apparatus themselves and continuous reading cannot be performed. As described above, each of the flatbed-type scanner apparatus and the ADF-type scanner apparatus is suitable for some objects to be read, but not suitable for other objects to be read. For scanner users, a scanner apparatus having both the functions is desired.

Conventionally, there has been proposed a scanner apparatus which includes both a flatbed-type mechanism and an ADF-type mechanism as shown in FIG. 10 (see, for example, Patent Document 1). Such a scanner apparatus provided with both the flatbed-type mechanism and the ADF-type mechanism has the ADF mechanism mounted on the upper portion of the paper-pressing board of the flatbed unit in order to reduce the area occupied by the installed apparatus. The orientation of the shooter of the ADF mechanism is set and fixed so as to be easy to use for right-handed users with regard to convenience when setting the paper. Due to the position and orientation of the shooter of the ADF mechanism being set in this manner, there has been a problem in that convenience for left-handed users is sacrificed and freedom with regard to the place where the apparatus itself can be set is lessened.

Further, in a conventional scanning apparatus provided with both the flatbed-type and ADF-type mechanisms, the ADF mechanism is coupled or attached to the upper portion of the paper-pressing board of the flatbed mechanism. For this reason, when reading is performed with the flatbed unit, reading cannot be performed with the ADF unit and when reading is performed with the ADF unit, reading cannot be performed with the flatbed unit, so reading with both units cannot be coordinated.

Patent Document 1: Japanese Patent Application Laid-Open (kokai) No. 2000-295391

DISCLOSURE OF THE INVENTION

Problem to be Solved by the Invention

The object of the present invention is to solve the above-mentioned problem and to provide a scanner apparatus provided with both a flatbed-type mechanism and an ADF-type mechanism, wherein the ADF mechanism can be set at an arbitrary position with an arbitrary orientation for use thereof, to thereby improve convenience for the user and ensure a degree of freedom regarding the place where the apparatus is set. Furthermore, reading with the flatbed unit and reading with the ADF unit can be performed simultaneously.

Means for Solving the Problem

The scanner apparatus of the present invention is provided with both a flatbed mechanism and an ADF mechanism. The ADF mechanism is supported via a movable coupling mechanism so that the relative position and orientation of the ADF mechanism in relation to the flatbed mechanism can be changed.

A movable coupling mechanism is provided at a joint portion between the ADF mechanism and the flatbed mechanism. The movable coupling mechanism does not fix the position and orientation of the ADF mechanism and enables the ADF mechanism to be freely moved and rotated. With this movable coupling mechanism, the ADF mechanism can be disposed at either of the left and right ends of the paper-pressing board of the flatbed unit or at an arbitrarily position in consideration of convenience for a user and the setting place of the apparatus. Further, the orientation of the shooter of the ADF mechanism can be freely changed.

Effect of the Invention

According to the present invention, the ADF mechanism can be set at an arbitrary position with an arbitrary orientation in accordance with a user's handedness or the setting place. In addition, since the ADF mechanism is disposed at a position where the ADF mechanism does not hinder reading with the flatbed mechanism, reading with the ADF mechanism and reading with the flatbed mechanism can be simultaneously performed, and these reading functions can be coordinated with each other.

DESCRIPTION OF SYMBOLS

Figure 1:
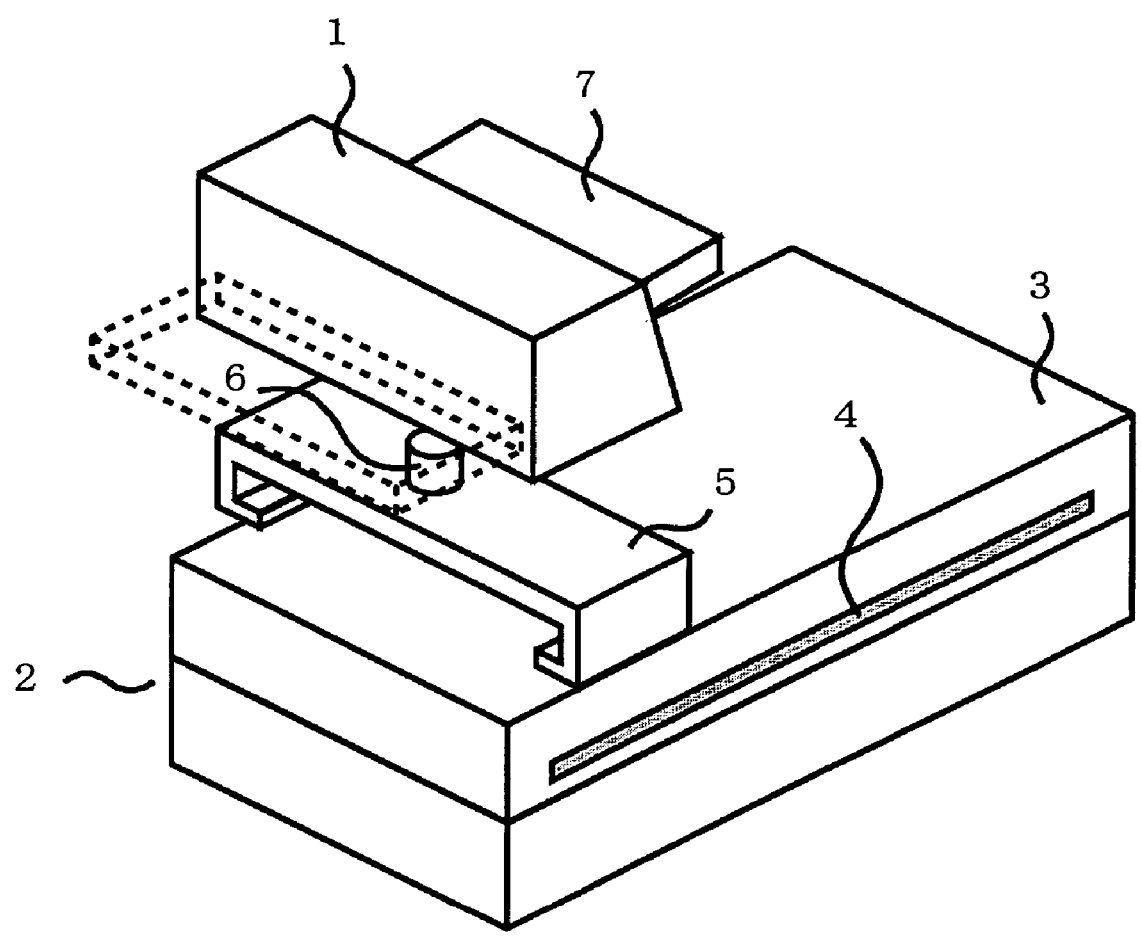
FIG. 1 is an overall structural diagram of the present invention.

1: ADF mechanism
2: flatbed mechanism
3: paper-pressing board
4: rail
5: slider
6: rotating post
7: shooter
8: stacker
9: ADF mechanism support base
10: coupling protrusion
11: attachment hole

BEST MODE FOR CARRYING OUT THE INVENTION

Hereafter, the present invention will be explained based on an example. FIG. 1 is an exploded perspective view of a scanner apparatus which embodies the present invention. An ADF mechanism 1 is provided on the upper portion of a flatbed mechanism 2 via a movable coupling mechanism. This configuration enables the position and orientation of the ADF mechanism 1 relative to the flatbed mechanism 2 to be freely determined and set. This movable coupling mechanism includes rails 4 which are formed from, for example, elongated protrusions and which are provided on the opposite side surfaces of a paper-pressing board 3; and a slider 5 that is movable to the left and right along the rails 4. As shown in the drawing, the slider 5, which is formed from an elongated plate member, is bent inwards at its left and right end portions, and the distal ends of the bent portions are engaged with the lower surfaces of the rails 4. The main body of the ADF mechanism 1 is coupled with a rotating post 6 on the upper surface of this slider 5. Due to this configuration, the main body of the ADF mechanism 1 is rotatably supported on the slider 5. This makes it possible for the ADF mechanism 1 to be disposed at an arbitrary position and with an arbitrary orientation relative to the flatbed mechanism 2, and the ADF mechanism 1 can be disposed in the most appropriate position in consideration the handedness of the user, the place where the apparatus will be set, and other factors.

Since the ADF mechanism 1 is mounted on the upper portion of the flatbed mechanism 2, an ADF mechanism support base can be provided at a position where the ADF mechanism 1 does not hinder the opening and closing of the paper-pressing board of the flatbed mechanism 2. The ADF mechanism 1 can be disposed on the ADF mechanism support base with a movable coupling mechanism such that it does not hinder the opening and closing of the paper-pressing board of the flatbed mechanism. By virtue of this configuration, image reading processing by the ADF mechanism and image reading processing by the flatbed mechanism can be performed simultaneously, and the image reading processings by these mechanisms can be coordinated with each other.

Figure 2A:
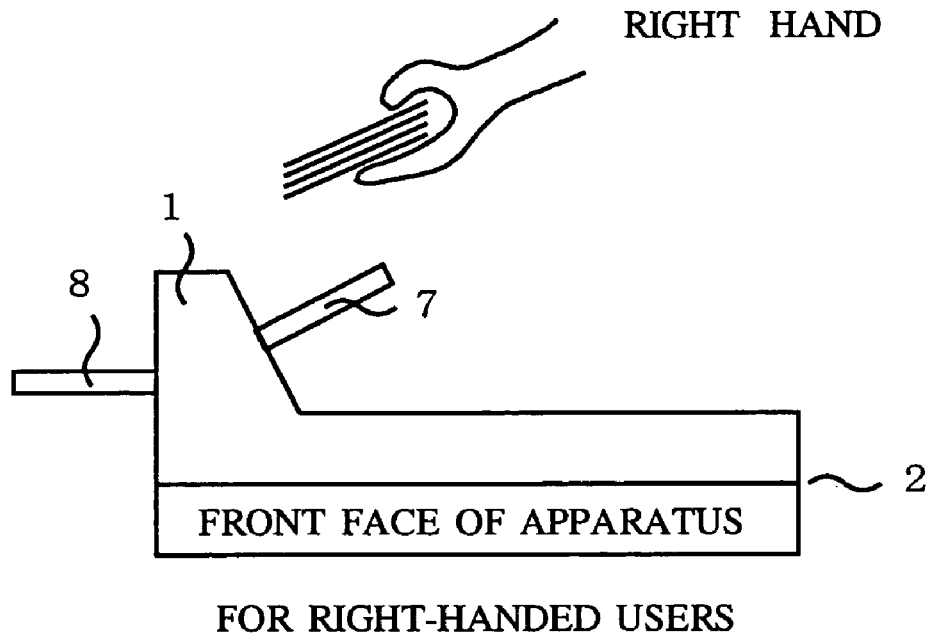
FIG. 2 is a pair of explanatory diagrams each showing the position and orientation of a shooter.
Figure 2B:
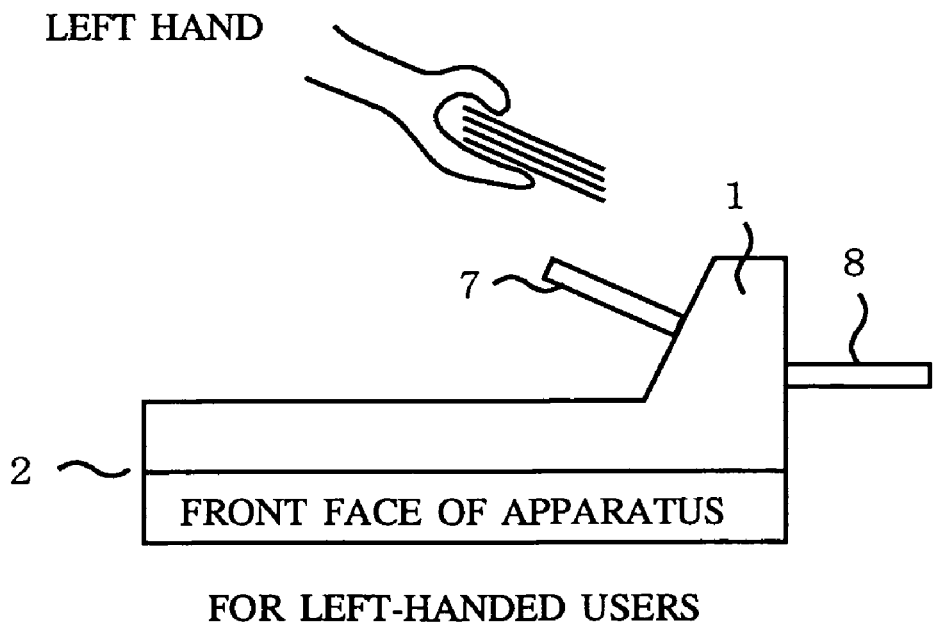

In the scanner apparatus provided with both a flatbed-type function and an ADF-type function, the ADF mechanism includes a member called a shooter 7 in which the documents to be read are set. The position and orientation of this shooter 7 greatly affect the easiness of paper setting. For example, in the case as shown in FIG. 2(A) in which the ADF mechanism 1 is disposed at the left end of the flatbed mechanism 2 as viewed from the front face of the apparatus, and the shooter 7 is oriented to face the right as viewed from the front face of the apparatus, the setting of paper in the shooter 7 becomes easier for right-handed users, who tend to be the majority. In contrast, in the case as shown in FIG. 2(B) in which the ADF mechanism 1 is disposed at the right end of the flatbed mechanism 2 as viewed from the front face of the apparatus, and the shooter 7 is oriented to face the left as viewed from the front face of the apparatus, the setting of paper in the shooter 7 easier for left-handed users.

Figure 3:
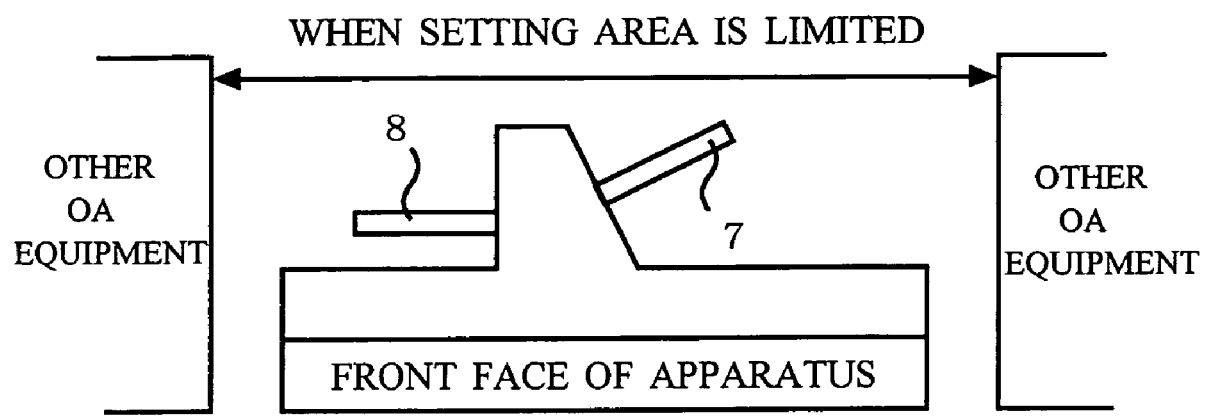
FIG. 3 is an explanatory diagram showing the case where an ADF mechanism is disposed at the central portion of the apparatus.

Further, the ADF mechanism is provided with a member called a stocker 8 that receives and stacks the read documents. As shown in FIG. 2(A) or (B), when the ADF mechanism 1 is disposed at the end of the apparatus, an additional setting area for the stocker 8 becomes necessary. For this reason, when there are limits such as the apparatus setting place being narrow, as shown in FIG. 3, the ADF mechanism 1 can be disposed in the central portion of the flatbed mechanism 2 so that the setting area for the apparatus can be minimized. In this manner, the best arrangement of the ADF mechanism relative to the flatbed mechanism changes depending on factors such as the handedness of the scanner user and the place where the apparatus is to be set.

Here, as shown in FIG. 1, the ADF mechanism of the present apparatus has the slider 5, which is provided at the portion where the ADF mechanism is coupled to the flatbed mechanism 2 such that the slider 5 is movable to the left and right along the rails 4 provided on the paper-pressing board 3 of the flatbed mechanism 2. Further, since the main body of the ADF mechanism 1 and the slider 5 are coupled by use of the rotating post 6, the main body of the ADF mechanism 1 can be rotated on the slider 5.

Figure 4A:
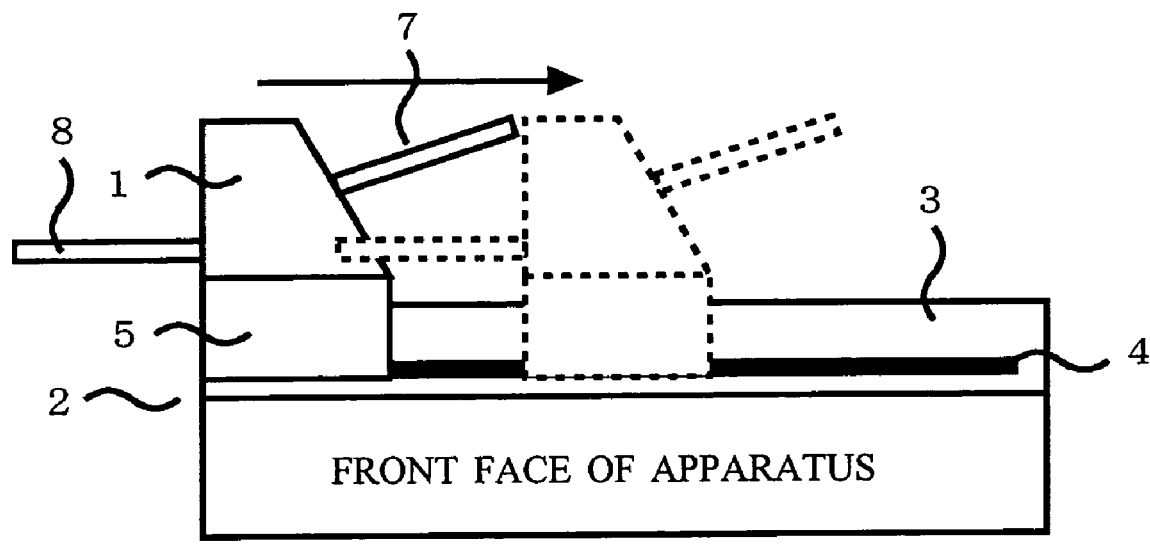
FIG. 4 is a pair of explanatory diagrams showing the freedom of configuration realized by the movable coupling portion of the ADF mechanism.

Due to this, as shown in FIG. 4(A), the shooter 7 is disposed to face the right as viewed from the front face of the apparatus so as to make the setting of paper in the shooter 7 easier for right-handed users. When there are limitations such as the setting place for the apparatus being narrow, the ADF mechanism 1 located at the left end of the flatbed mechanism 2 is moved to the central portion of the apparatus by moving the slider 5 joined to the ADF mechanism 1 along the rails 4. Therefore, the shooter 7 and stocker 8 can be stored within the width of the apparatus and the area occupied by the apparatus can be minimized.

Figure 4B:
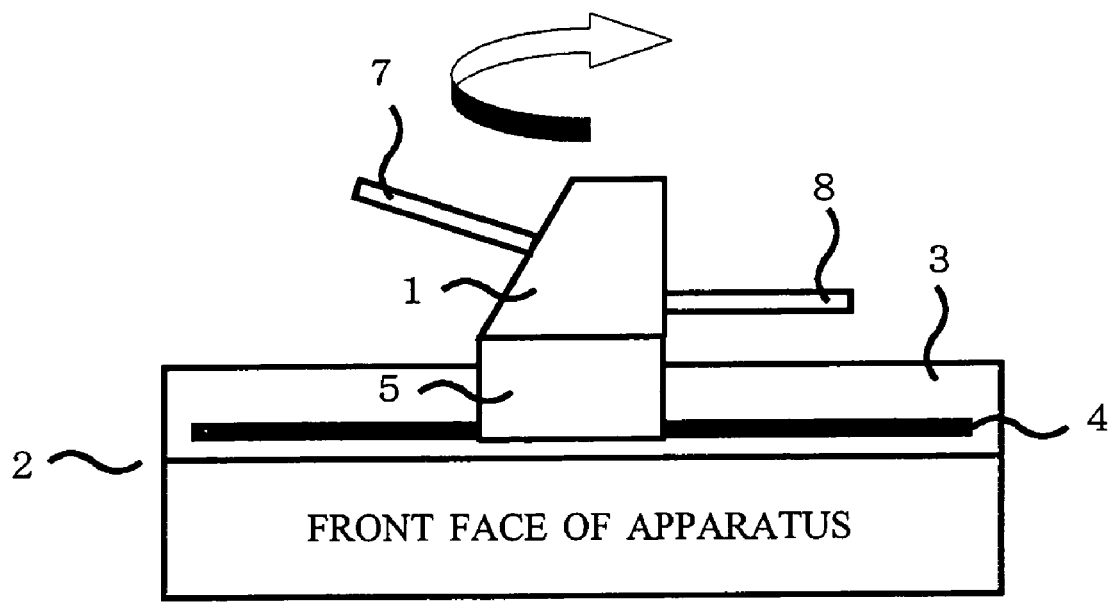

Further, as shown in FIG. 4(B), when a left-handed user uses the apparatus, the ADF mechanism 1 can be rotated on the slider 5 by 180 degrees, whereby the shooter 7 is disposed to face the left side as viewed from the front face of the apparatus so as to make the setting of paper in the shooter 7 easier.

Figure 5A:
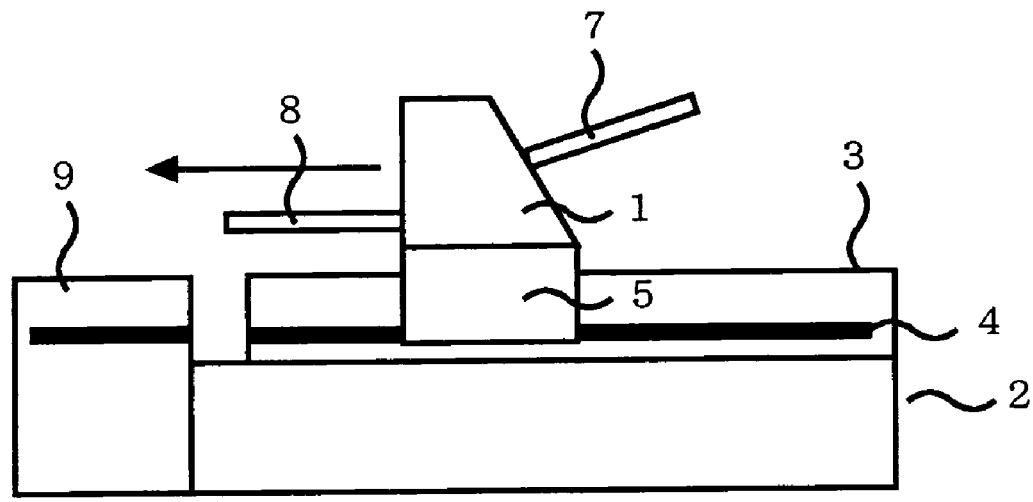
FIG. 5 is a first pair of explanatory diagrams showing the case where an ADF mechanism support base is provided.
Figure 5B:
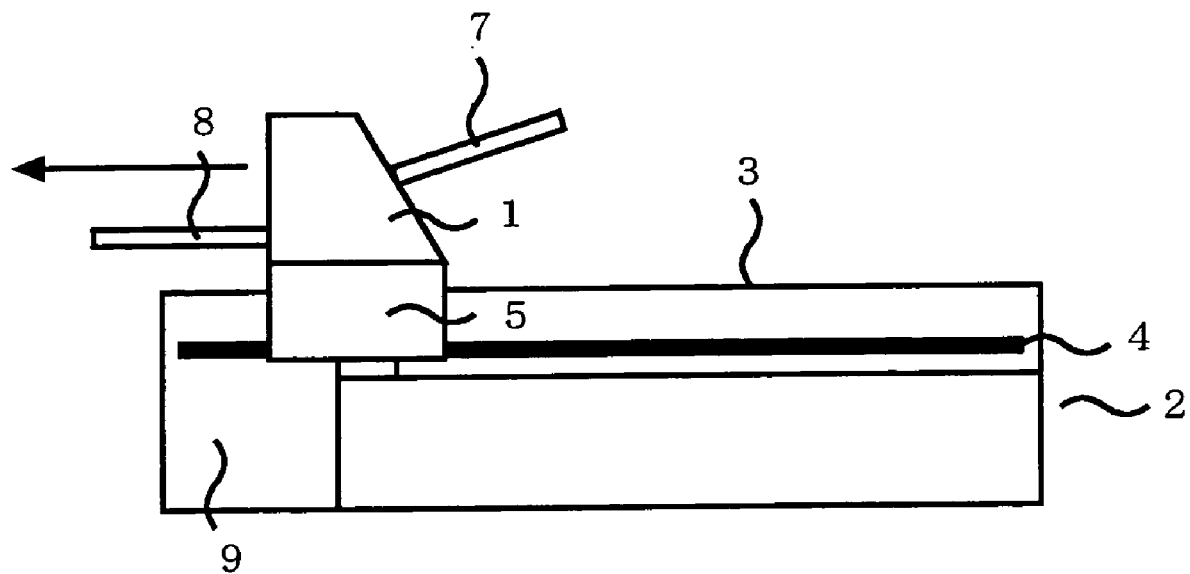
Figure 6A:
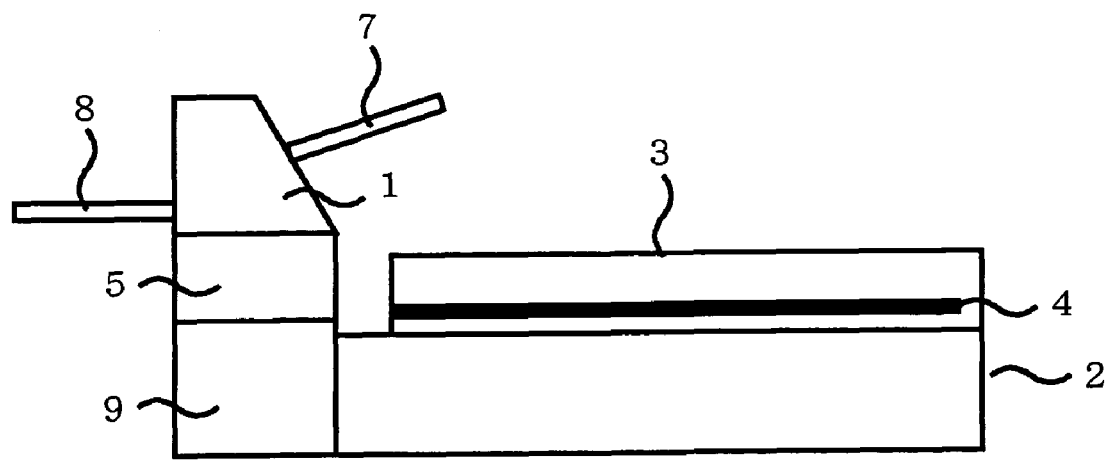
FIG. 6 is a second pair of explanatory diagrams showing the case where the ADF mechanism support base is provided.
Figure 6B:
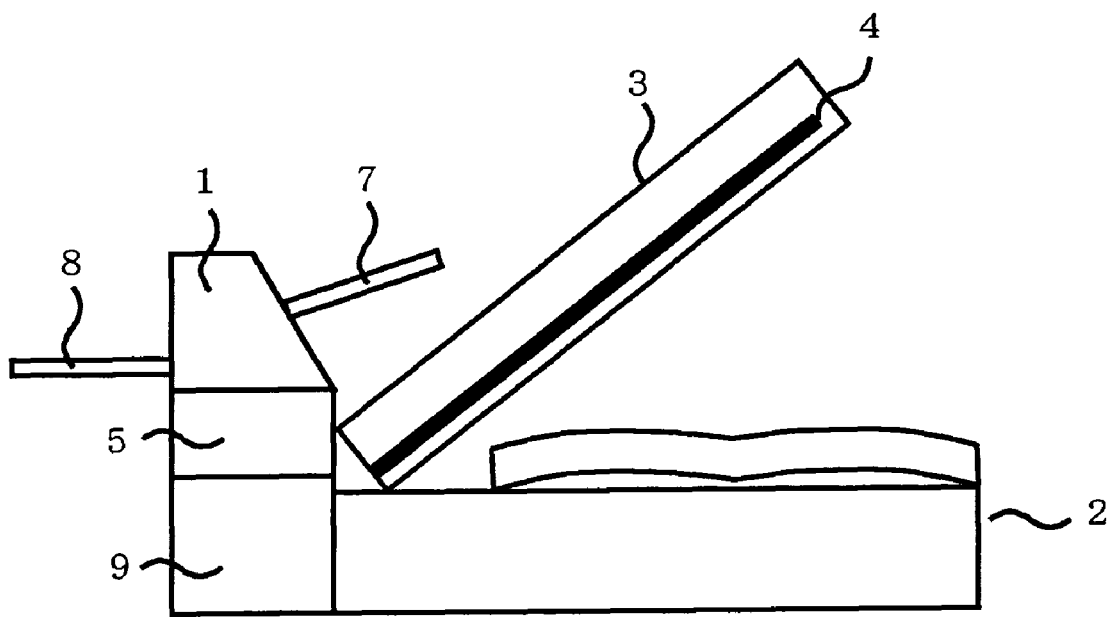

As shown in FIG. 5(A), an ADF mechanism support base 9 can be provided to the side of the paper-pressing board 3 of the flatbed mechanism 2. The ADF mechanism support base 9 has rails provided on the side surfaces thereof so as to support the ADF mechanism. Therefore, as shown in FIG. 5(B), the ADF mechanism 1 having been disposed on the paper-pressing board 3 can be slid onto the ADF mechanism support base 9 and mounted thereon. By virtue of this configuration, as shown in FIG. 6(A), the ADF mechanism 1 can be disposed on the ADF mechanism support base 9, whereby, as shown in FIG. 6(B), the opening and closing of the paper-pressing board 3 of the flatbed mechanism 2 is not obstructed. Therefore, reading with the ADF mechanism and reading with the flatbed mechanism can be performed simultaneously. In this manner, by simultaneously performing the reading with the flatbed unit and the reading with the ADF unit, coordinated image reading can be performed; e.g., an image read with the flatbed unit can be incorporated into a portion of documents continuously read with the ADF unit.

Figure 7:
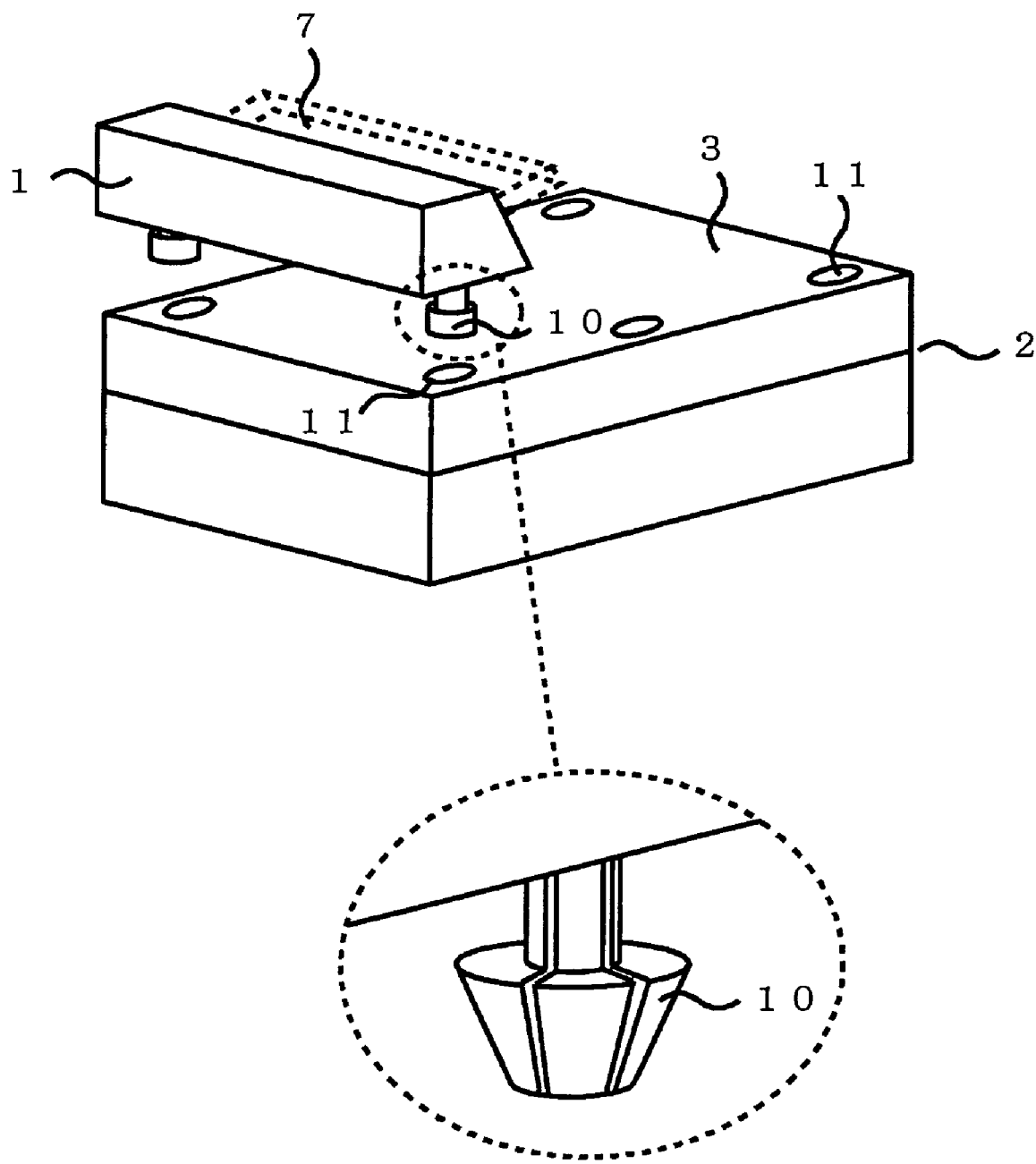
FIG. 7 is an explanatory diagram showing the case where an insertion-type coupling portion is used.

It should be noted that the movable coupling mechanism that couples the ADF mechanism to the flatbed mechanism can have a configuration other than the one described above and using a slider. As shown in FIG. 7, coupling protrusions 10 for coupling to the flatbed mechanism can be provided on the bottom surface of the ADF mechanism 1. By inserting these coupling protrusions 10 into attachment holes 11 provided on the paper-pressing board 3, the ADF mechanism 1 can be coupled with the flatbed mechanism 2 at a desired position and with a desired orientation.

Figure 8:
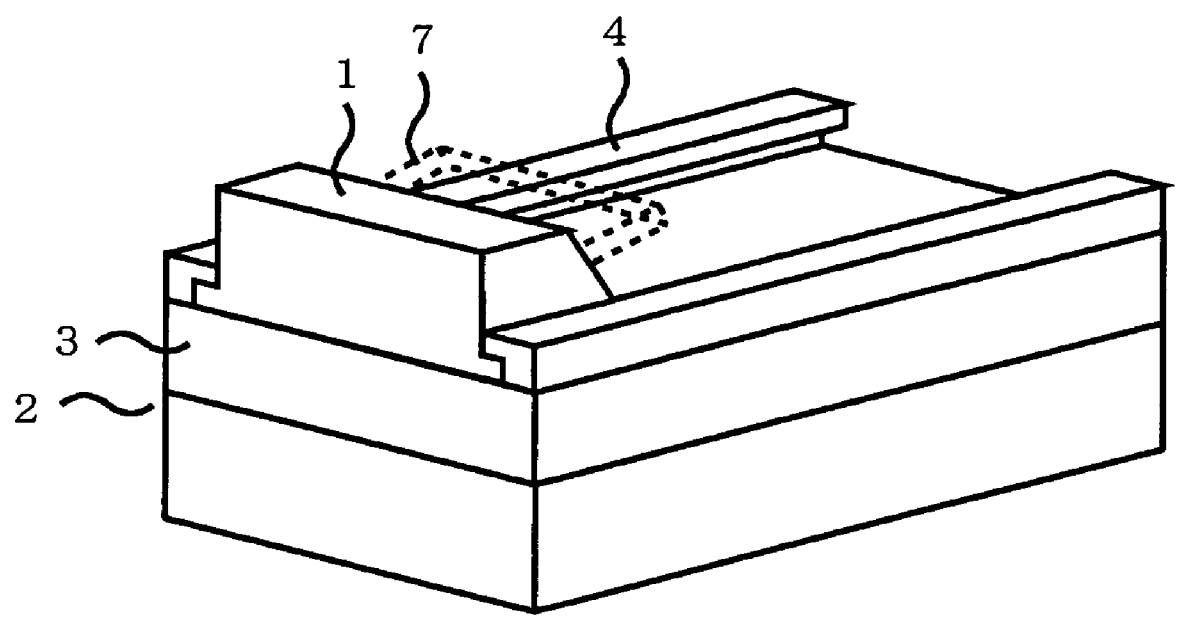
FIG. 8 is an explanatory diagram showing the case where the ADF mechanism itself slides along the rail.
Figure 9A:
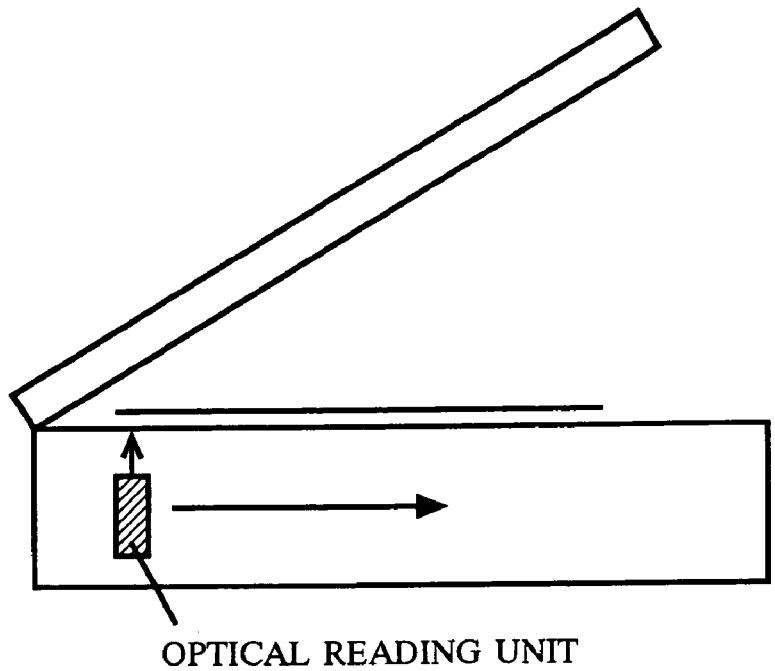
FIG. 9 is a pair of explanatory diagrams showing conventional flatbed-type and ADF-type scanner apparatuses.
Figure 9B:
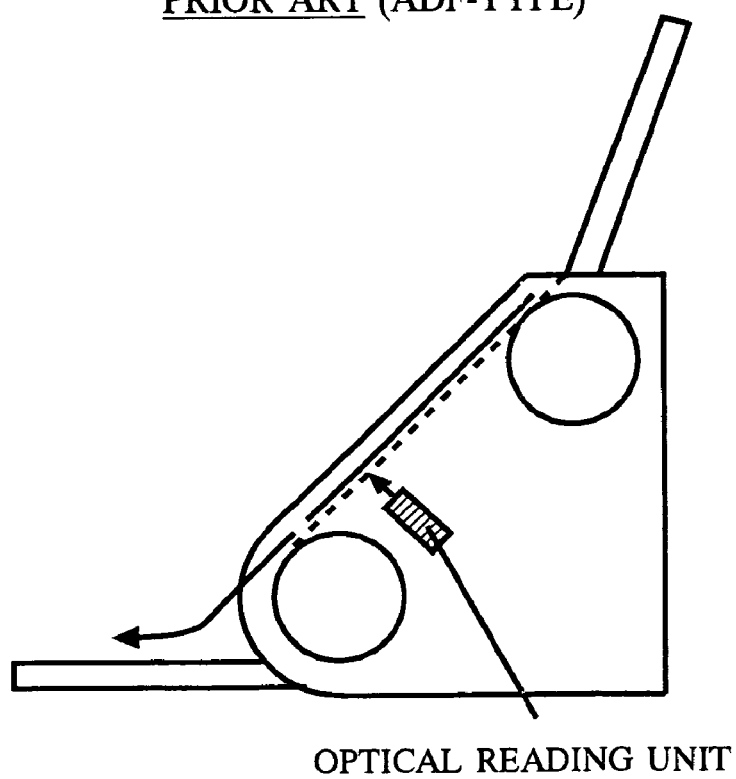
Figure 10:
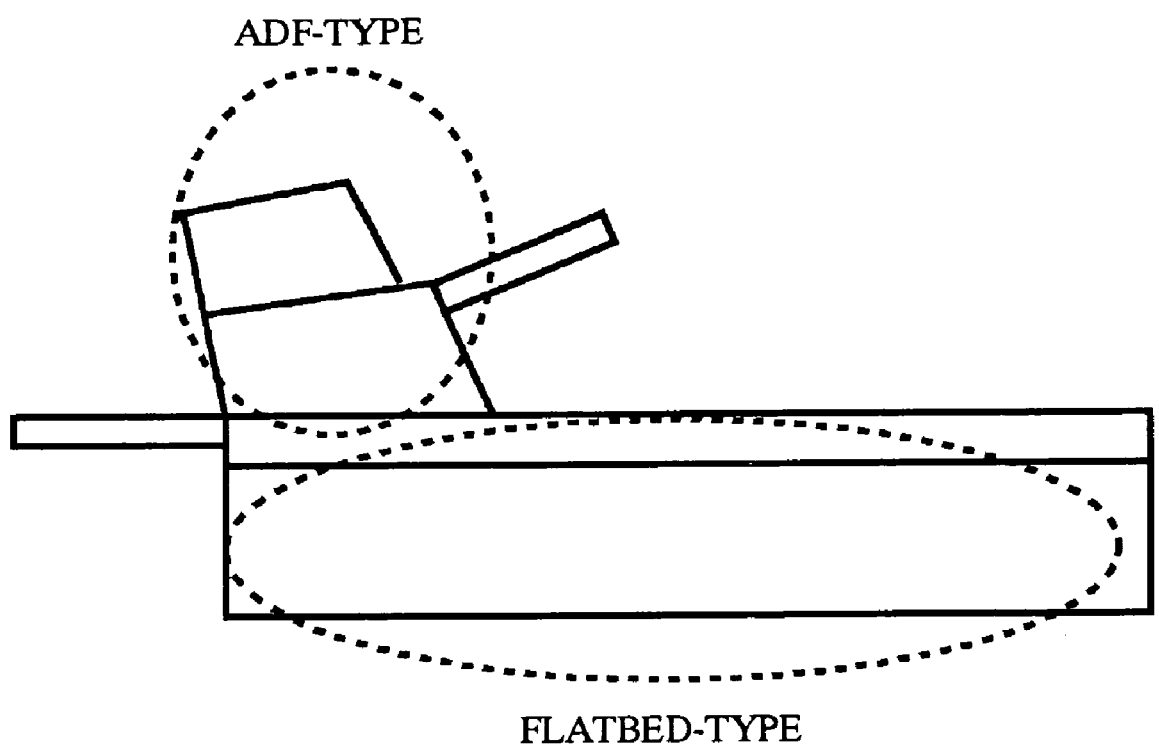
FIG. 10 is an explanatory diagram of a conventional scanner apparatus provided with both a flatbed-type function and an ADF-type function.

Alternatively, as shown in FIG. 8, the rails 4 are provided on the paper-pressing board 3 at opposite sides, and the ADF mechanism 1 itself has opposite end portions having a reduced height. The opposite end portions of the ADF mechanism 1 are held between the rails 4 and the paper board 3 such that the ADF mechanism can be moved to the left and right. Further, by inserting the ADF mechanism between the rails 4 with a reversed orientation, its facing direction can be changed from the right to the left or from the left to the right.

The invention claimed is:

1. A scanner apparatus, comprising:
    a flatbed mechanism; and
    an auto-document feeder mechanism, wherein
        the auto-document feeder mechanism is supported via a movable coupling mechanism so that the relative position and relative orientation of the auto-document feeder mechanism in relation to the flatbed mechanism can be changed, and
        the auto-document feeder mechanism operates at a relative position selected from a plurality of positions with an orientation selected from opposite orientations on the flatbed mechanism, the auto-document feeder mechanism being configured to operate at each of the plurality of positions in each of the opposite orientations.

2. A scanner apparatus of claim 1, wherein an auto-document feeder mechanism support base is provided at a position that does not obstruct the opening and closing of a paper-pressing board of the flatbed mechanism, and the auto-document feeder mechanism is disposed on the auto-document feeder mechanism support base via the movable coupling mechanism, whereby reading with the flatbed mechanism and reading with the auto-document feeder mechanism are simultaneously performed.

3. A scanner apparatus of claim 1, further comprising, as the movable coupling mechanism, rails provided on the flatbed mechanism, a slider which is movable along the rails, and a rotating post for coupling the slider and the auto-document feeder mechanism, whereby the auto-document feeder mechanism can be moved along the rails and rotated.

4. A scanner apparatus of claim 1, further comprising, as the movable coupling mechanism, rails provided on the flatbed mechanism, and the auto-document feeder mechanism itself having a shape which enables the auto-document feeder mechanism to be fitted onto the rails with an orientation selected from opposite orientations, whereby the auto-document feeder mechanism itself can move along the rails.

5. A scanner apparatus of claim 1, further comprising, as the movable coupling mechanism, coupling protrusions provided on a bottom portion of the auto-document feeder mechanism, wherein the coupling protrusions are inserted into selected holes of attachment holes provided at a plurality of positions on the flatbed mechanism, whereby the auto-document feeder mechanism can be disposed at a selected position with an orientation selected from opposite orientations.

6. A scanner apparatus, comprising:
    a flatbed document-reading mechanism;
    an auto-document feeder mechanism; and
    a movable coupling mechanism supporting the auto-document feeder mechanism so that the auto-document feeder mechanism is configured to move with respect to a surface of the flatbed document-reading mechanism and rotate with respect to the flatbed document-reading mechanism.

* * * * *